United States Patent [19]

Alber

[11] Patent Number: 4,550,924
[45] Date of Patent: Nov. 5, 1985

[54] HAND-OPERATED CART

[76] Inventor: Ulrich Alber, 7470 Albstadt, 16-Laufen, Fed. Rep. of Germany

[21] Appl. No.: 513,980

[22] Filed: Jul. 14, 1983

[30] Foreign Application Priority Data

Jul. 14, 1982 [DE] Fed. Rep. of Germany ....... 3226294

[51] Int. Cl.⁴ .............................................. B62B 5/02
[52] U.S. Cl. ................................... 280/5.28; 280/5.3; 280/47.27
[58] Field of Search ................... 280/5.28, 5.32, 47.2, 280/47.29, 43.1, 5.2, 5.3, 47.27; 180/8.2, 19.1

[56] References Cited

U.S. PATENT DOCUMENTS 2,192,396 3/1940 Burch ................................... 280/5.3

FOREIGN PATENT DOCUMENTS

1505834 8/1969 Fed. Rep. of Germany .

Primary Examiner—David M. Mitchell
Assistant Examiner—Richard M. Camby
Attorney, Agent, or Firm—Michael J. Striker

[57] ABSTRACT

Hand-operated cart for transporting loads, such as household machines, bags or the like and including a traveling frame with two running wheels and a load-carrying frame with two supporting wheels is provided with a device for adjusting the cart to be moved along a staircase. The device includes an electric motor and a crank drive on the traveling frame and operated by the electric motor. The crank drive is adapted to operate such that its crank pins engage the load-carrying frame so as to adjust the relative position of the load-carrying frame and the traveling frame to each other when the cart is moved along the staircase.

11 Claims, 8 Drawing Figures

HAND-OPERATED CART

BACKGROUND OF THE INVENTION

The present invention relates to an uniaxial cart provided with hand grips.

Hand-operated carts of the type under consideration have two running wheels and can employ a device for allowing the cart to be moved along the staircase.

One of known hand-operated carts for transporting boxes, bags, sacks or the like is disclosed in German publication DE-OS 15 05 834. This cart has a supporting shaft situated on pivoting arms of a driven shaft, the supporting shaft can be supported on the step of the staircase. With this transporting device the cart is lifted by the pivoting arms while the supporting shaft rests on the step. To lift the cart from the ground or from the step of the staircase the operator should apply certain torque to the grips of the hand-operated cart. It should be noted that it is particularly disadvantageous that this torque is applied to the grips strikingly and the operation of the whole device therefore requires high concentration from the person moving the cart to prevent falling of the cart with the load from the step of the staircase.

SUMMARY OF THE INVENTION

It is an object of the present invention to provide an improved hand-operated cart.

It is another object of the invention to provide a cart with a device for moving the cart upstairs and downstairs which would ensure a controllable transportation of the load along the staircase.

It is a further object of the present invention to provide a hand-operated cart with the device which would facilitate the movement of the cart upstairs by the operator.

These and other objects of the invention are attained by an uniaxial hand-operated cart, comprising a traveling body including a platform and two coaxial running wheels; a load-carrying portion including grips, a board to receive a load being transported, two opposite side walls and two coaxial supporting wheels rotatably supported on the respective side walls; and means for adjusting the cart to be moved along a staircase in upward and downward direction, said means being driven by an electric motor switchable in two opposite directions of rotation and mounted on said platform and including a battery electrically connected to said motor, a transmission gearing connected to said motor and a crank drive mounted on the traveling body and coupled to said transmission gearing, said crank drive including two crank pins engageable with said side walls, respectively, so as to adjust a relative position of the traveling body and the load-carrying portion to each other to permit the rest position of the cart and the movement of the cart along the staircase.

According to a further feature of the invention the crank drive may further comprise two coaxial crank wheels each being arranged concentrically to the respective running wheel, at least one of said crank wheels being operatively connected to said transmission gearing and being continuously actuated thereby.

The transmission gearing may be self-lagging.

The crank drive may further include a crank shaft, on which said crank wheels are supported, and two crank arms each being interconnected between said crank shaft and the respective crank pin.

Each crank arm may be shorter than the radius of the running wheel.

The traveling body may further include a guide rod terminated with a guide pin at one end thereof, said load-carrying portion including a frame formed with a guide groove, said guide pin being slidably positioned in said groove.

The transmission gearing has an output shaft which may be coupled to said at least one crank wheel by a driving chain.

Each of the supporting wheels may be mounted to said side walls on an axle which is located so that the shortest distance of said axle from a point of engagement of the respective crank pin with the respective side wall approximately corresponds to the length of the crank arm.

In the cart provided with means for adjusting the cart to be moved along a staircase according to the invention, the load-carrying portion with the load received thereon is not pulled in the upward direction but instead is pushed upwardly so that no extreme torque-oscillating actions on the hand grips are required from the operator. Due to the adjustment of the relative position of the load-carrying portion and the traveling body of the cart the latter can, by the above adjusting means, be lifted from the bearing surface any required distance, this distance corresponding to the distance of the transport surface of small transporting devices from the street surface. The adjusting means according to the invention also aid in loading and unloading of the cart. The operation of the adjusting means permits the running wheels with the traveling body to be adjusted in height when the load-carrying portion is put on the ground so that loading of the box or sack lying on the ground onto the platform of the cart is facilitated.

Due to the invention the running wheels and supporting wheels can be brought by said adjusting means to such a relative position in which the cart loaded with a box or a sack can always rest on all four wheels. The cart can also be used without the utilization of the adjusting means for allowing easy movement of the cart along the stairs.

Furthermore, the diameter of each running wheel may be at least 25 cm.

The present invention ensures that, for a usual range of center of gravity of the loaded cart, the operator can select the most favorable inclined positions of the cart on the staircase for easy rising the cart upstairs.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
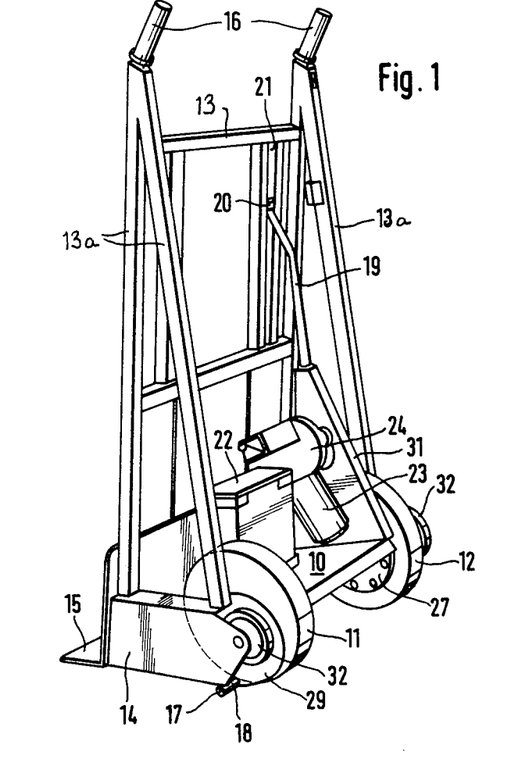
FIG. 1 is a perspective view of a hand-operated cart according to the invention in an unloaded and rest position.
Figure 7:
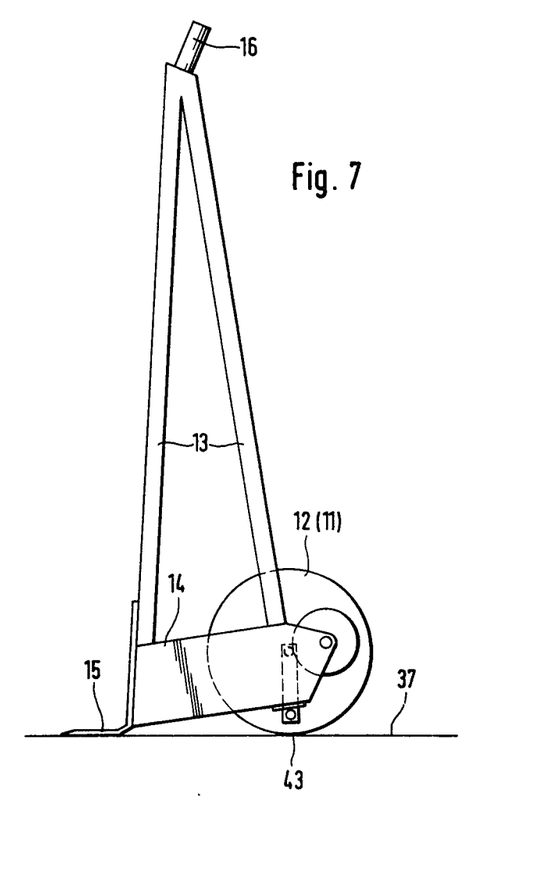
FIG. 7 is a side view of the cart in the position in which the cart is to be loaded and before the running wheels are to be lifted from the ground.

With reference to FIGS. 1 and 7 showing the cart in the stationary position it will be seen that the hand-manipulated cart according to the invention includes two main portions which are adustable relative to each other. One of those portions is a traveling frame or body including a platform 10 to which two coaxially arranged running wheels 11 and 12 are connected. The second portion of the cart is a load-carrying portion which includes a supporting frame 13 with two opposite angled subframes 13a each of which is connected at the lower end thereof to a respective side wall 14, and a bearing board 15 connected to the front ends of opposite side walls 14. The upper ends of subframes 13a are terminated with respective grips 16 for an operator.

Coupling of the traveling body with the load-carrying portion of the cart is effected, first by means of a moving joint 17 which will be explained in detail below, and, secondly, by means of a guide rod 19 secured to the traveling body, as will be explained herein below, and provided with a guide pin 20 at the end thereof, which guide pin is adapted to slide in a groove 21 formed in the supporting frame 13. A crank pin 18 of the device for adjusting the cart to be moved along the stairs is engaged with the moving joint 17 as will be explained below.

As shown in FIG. 1 platform 10 carries thereon a battery 22 rechargeable from a power supply of a transporting vehicle, an electric motor 23 electrically connected to battery 22 and a self-lagging transmission gearing 24 coupled to the output shaft of the electric motor in the known per se manner.

Figure 2:
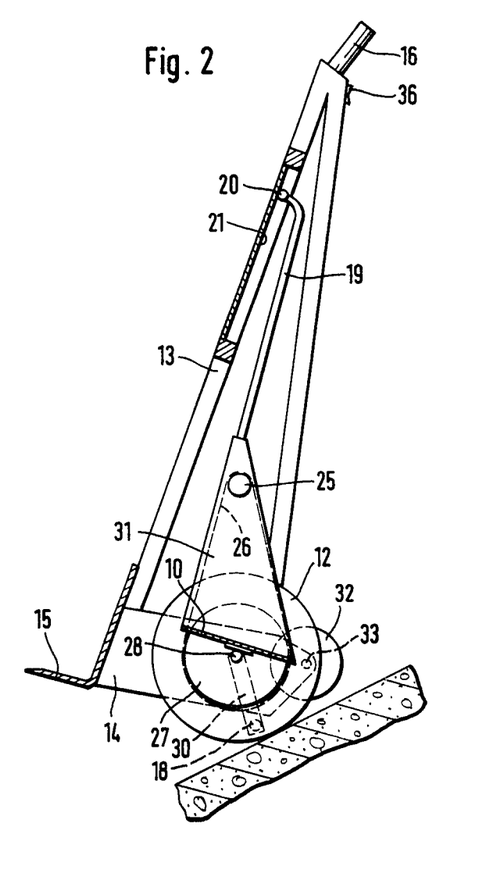
FIG. 2 is a side view of the cart according to the invention in a normal running position.
Figure 3:
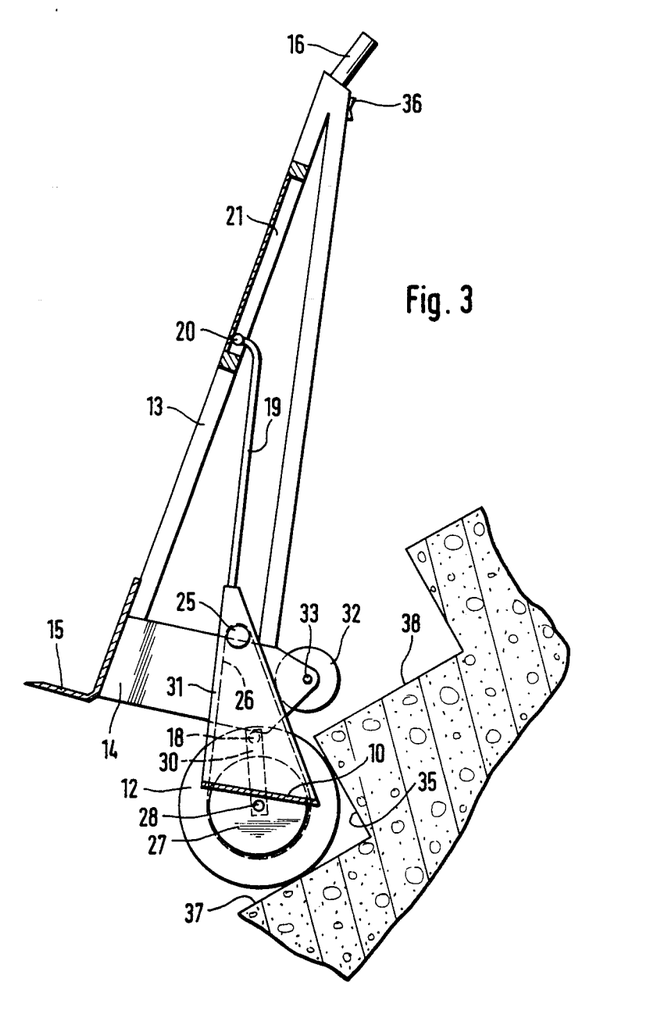
FIG. 3 is a side view of the cart positioned on a staircase, with the load-carrying portion pushed in the upward direction.

With reference to FIGS. 2 and 3 a pinion 25 is shown, which is secured on the output shaft of the transmission gearing also in the conventional manner. Pinion 25 serves as a drive gear for a driving chain 26 shown by a dotted line. Chain 26 is driven over a chain gear 27 which is arranged coaxially with the running wheel 12. Chain gear 27 and another pinion 29 (FIG. 1) which is opposite to the gear 27 are arranged on a common drive shaft 28 mounted to the platform 10. A respective crank arm 30 of the device for adjusting the cart on the staircase is interconnected between the drive shaft 28 and the respective crank pin 18 which engages against the lower surface of the respective side wall 14 via the moving or coupling joint 17. The drive chain 26 is accommodated within a protective housing 31, to the upper side of which the end of the guide rod 19 is connected. Both running wheels 11 and 12 are freely rotatable on the shaft 28.

At rear ends of both side walls 14 of the load-carrying portion of the cart are arranged two opposite supporting wheels 32. Each supporting wheel is freely rotatable about a respective axle 33 mounted in the respective side wall 14 and extended parallel to the drive shaft 28. Running wheels 11, 12 and both supporting wheels 32 can be provided with suitable gripping covers or linings.

FIGS. 1, 2 and 7 illustrate the hand-operated cart with the traveling body and the load-carrying portion in three different relative positions but with the running wheels resting on the ground. The cart in these positions can be moved or stopped (as shown in FIGS. 1 and 7) on the flat ground by a single operator holding the grips 16 in the manner similar to that for conventional carts of the type under discussion. If the cart encounters a staircase the operator switches on electromotor 23 by means of an electrical switch 36 (FIG. 2) which is mounted in the vicinity of one of the grips 16 and is switchable to put on the motor in two directions of rotation. Electric motor 23 causes the chain wheel 27 and thereby the coaxial wheel 29 rigidly coupled to wheel 27 to rotate relatively slow in the clockwise direction as seen in FIGS. 2 and 3. This rotation movement leads to the joined rotation of crank arms 30 which are, respectively rigidly connected to wheels 27 and 29. Crank arms 30 which, via the crank pins 18 and coupling joints 17, engage the lower surfaces of both side walls 14 push the latter together with the remaining part of the load-carrying portion upwardly from the position shown in FIG. 3. In this lifted position of the load-carrying portion the load can be transferred from the platform of the transporting vehicle to the bearing board 15 of the cart; supporting wheels 32 in this position are located above the bearing surface 37 on which running wheels 11 and 12 rest, this distance being longer than the height of one step of the staircase.

Figure 4:
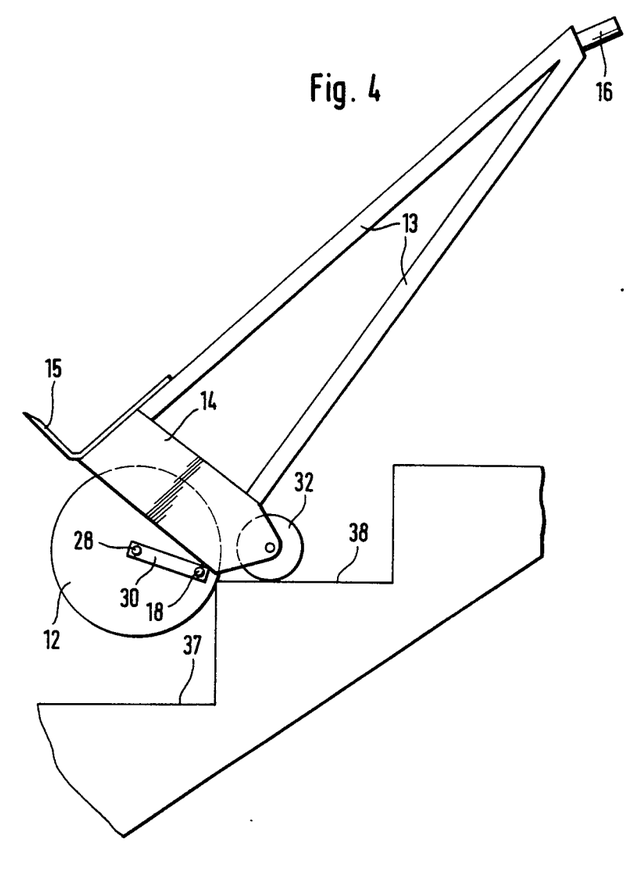
FIG. 4 is a side view of the cart in the position in which the supporting wheels rest on the step of the staircase and the running wheels of the traveling body of the cart are lifted.
Figure 5:
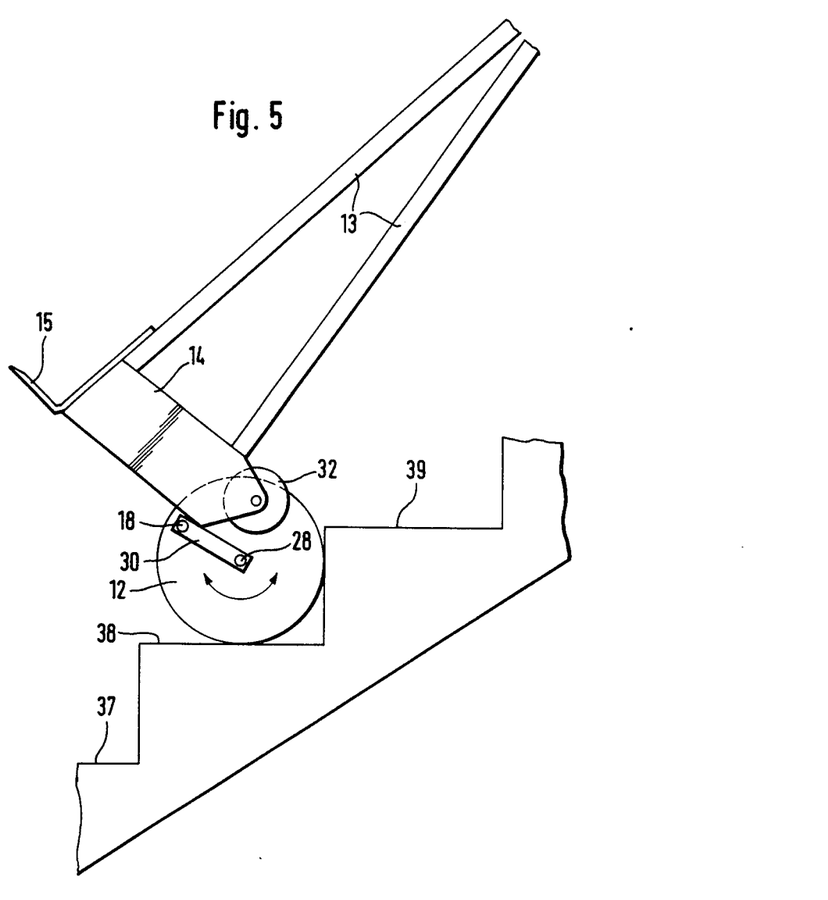
FIG. 5 is a side view of the cart in the position, in which the running wheels of the traveling body of the cart rest on the step of the staircase and the load-carrying portion of the cart together with the supporting wheels is lifted to be brought onto the next step of the staircase.

Now the hand-operated cart with the lifted load-carrying portion should be moved on the running surface 37 against the step-adjoint piece 35. When electromotor 23 is further rotated crank arms 30 move further in the clockwise direction which effects a lowering of the load-carrying portion; this takes place unless both supporting wheels 32 come into contact with the first step 38. The load-carrying portion of the cart is now firmly supported by wheels 32 on the step 38 which means that if electromotor 23, namely its output shaft, is continuously further rotated the coupling joints 17 of the crank pins 18 are clamped or locked on the load-carrying portion and the crank arms 30 swivel about respective joints 17. This means that drive shaft 28 with wheels 27 and 29 and with the whole traveling body will swing about the crank pins 18 as seen in FIG. 4. For the sake of clarity the portion of the traveling body aside from shaft 28 and running wheels 11, 12 is not illustrated in FIGS. 4 through 7.

When the traveling body is lifted up while the load-carrying portion of the cart remains stationary the guide pin 20 of the guide rod 19 of the traveling body slides upwardly in the groove 21 of the frame 13 to a position seen in FIG. 2. During the upward movement of the load-carrying portion of the cart with the traveling body remaining in the stationary position as shown in FIG. 3 a relative downward adjusting movement of the guide pins 20 in the groove 21 results.

If wheels 27 and 29 with crank arms 30 are further rotated in the clockwise direction running wheels 11, 12 will swing onto the step 38, and as soon as running wheels 11 and 12 come into contact with the surface of step 38 the traveling body of the cart will again rest against the surface of step 38 and the further rotation of the electromotor will again cause the swivelling of crank arms 30 about drive shaft 28, which would lead to a following lifting of the load-carrying portion of the cart. Such a lifting and a sequential slight descending take place unless supporting wheels 32 come into contact with the next step 39. Then the reverse movement of the traveling body described in regard to FIG. 4 is repeated.

It is to be understood that when the cart is moved downstairs the above described moving process is performed in the reverse sequence. The electromotor 23 is then switched over by the switch 36 to the opposite direction.

Figure 6:
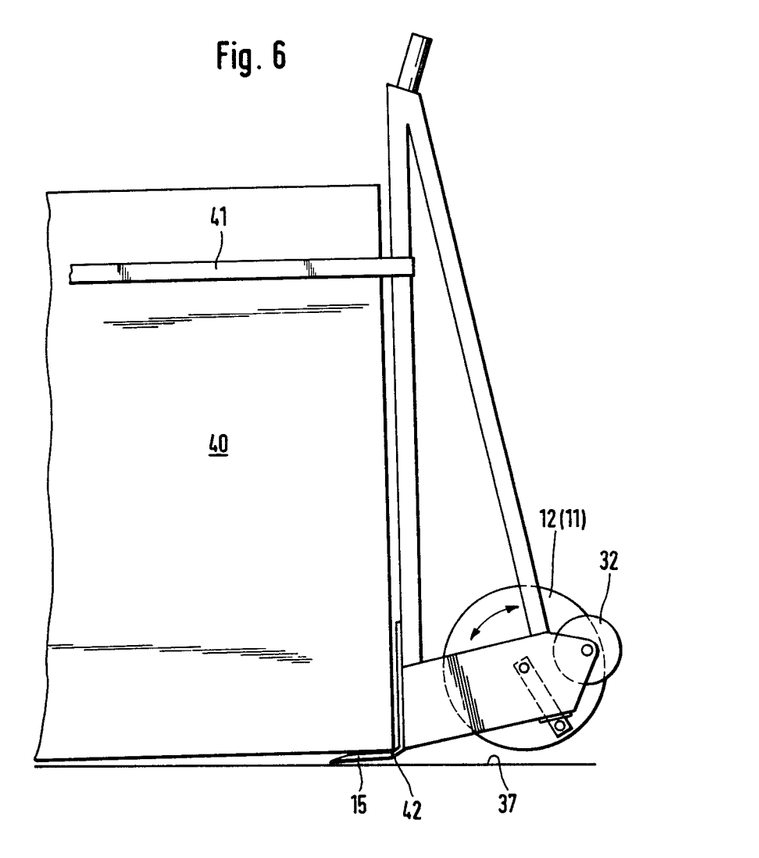
FIG. 6 is a side view of the cart in the position in which the running wheels are lifted from the ground to receive a load onto the load-carrying portion.

It is understood from the described embodiment that the cart can be placed from the stationary position shown in FIG. 7, to a position in which a load, for example a cardboard box 40 with a household machine accommodated therein, is lifted from the floor, placed onto the board 15 and secured to the frame 13 of the load-carrying portion by a belt 41 as shown in FIG. 6. This is accomplished by operating electromotor 23 to lift the cart up and to permit running wheels 11 and 12 to be lifted from the bearing surface 37. This action causes a tilting of the loaded cart from its stationary position to its inclined transporting position because a tilting axis is first formed by an edge 42 of the bearing board 15 and this tilting axis is then displaced to a rest point 43 of the running wheel 11 or 12 as shown in FIG. 7. It is to be realized that the operator encounters no difficulties in lifting load 40 up in the position of the cart illustrated in FIG. 6.

Figure 8:
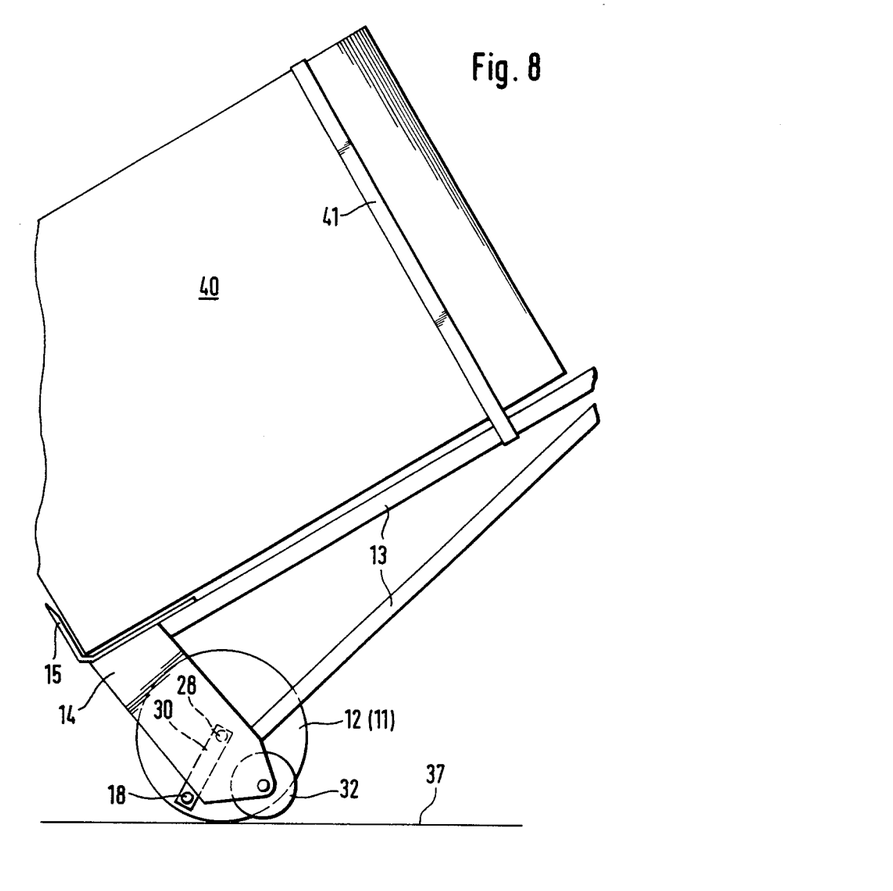
FIG. 8 is a side view of the loaded cart in the rest position.

FIG. 8 depicts the relative position of the traveling body with running wheels 11, 12 and the load-carrying portion with supporting wheels 32. The loaded cart in this position rests on running wheels 11, 12 and supporting wheels 32 without tilting. Such a stop or arrested position can be practically found for any load and also for any center of gravity of the load by adjusting the positions of the traveling body and load-carrying portion to each other.

The above described device for adjusting the hand-operated cart to be moved on the staircase is easy to operate.

Each running wheel 11, 12 has a diameter of at least 25 cm. The shortest distance of the axle 33 of each supporting wheel 32 from the engagement point of joint 17 of the crank pin 18 approximately corresponds to the length of the crank arm 30.

It is also essential that each crank arm 30 is shorter than the radius of the running wheel 11 or 12.

It will be understood that each of the elements described above, or two or more together, may also find a useful application in other types of hand-operated carts differing from the types described above.

While the invention has been illustrated and described as embodied in a hand-operated cart, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A uniaxial hand-operated cart, comprising a traveling body including a platform and two coaxial running wheels; a load-carrying portion connected to said traveling body and including grips, a board to receive a load being transported, two opposite side walls and two coaxial supporting wheels rotatably supported on the respective side walls, and means for adjusting the cart to be moved along a staircase in upward and downward direction, said means being driven by an electric motor switchable in two opposite directions of rotation and mounted on said platform and including a battery electrically connected to said motor, a transmission gearing connected to said motor and a crank drive mounted on the traveling body and coupled to said transmission gearing, said crank drive including two crank pins engaging said side walls, respectively so as to permit an adjustment of a relative position of the traveling body and the load-carrying portion to each other and thus to permit the rest position of the cart and the movement of the cart along the staircase.

2. The cart as defined in claim 1, wherein said crank drive further comprises two coaxial crank wheels each being arranged concentrically to the respective running wheel, at least one of said crank wheels being operatively connected to said transmission gearing and being continuously actuated thereby.

3. The cart as defined in claim 2, wherein said transmission gearing is self-lagging.

4. The cart as defined in claim 3, wherein said crank drive further includes a crank shaft, on which said crank wheels are supported, and two crank arms each being interconnected between said crank shaft and the respective crank pin.

5. The cart as defined in claim 4, wherein each of said crank pins is pivotally mounted relative to the respective side wall by a coupling joint.

6. The cart as defined in claim 5, wherein each crank arm is shorter than the radius of the running wheel.

7. The cart as defined in claim 6, wherein said traveling body further includes a guide rod terminated with a guide pin at one end thereof, said load-carrying portion including a frame formed with a guide groove, said guide pin being slidably positioned in said groove.

8. The cart as defined in claim 7, wherein said transmission gearing has an output shaft, said output shaft being coupled to said at least one crank wheel by a driving chain.

9. The cart as defined in claim 8, wherein each of said supporting wheels is mounted to said side wall on an axle which is located so that the shortest distance of said axle from a point of engagement of the respective crank pin with the respective side wall approximately corresponds to the length of the crank arm.

10. The cart as defined in claim 1, wherein the diameter of each running wheel is at least 25 cm.

11. The cart as defined in claim 8, wherein said battery and said transmission gearing are mounted on said platform.

* * * * *